US008320469B2

(12) United States Patent
Kato

(10) Patent No.: US 8,320,469 B2
(45) Date of Patent: Nov. 27, 2012

(54) APPARATUS FOR ENCODING AND DECODING HEADER DATA IN PICTURE SIGNAL TRANSMISSION

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/480,130

(22) Filed: May 24, 2012

(65) Prior Publication Data

US 2012/0230440 A1    Sep. 13, 2012

Related U.S. Application Data

(63) Continuation of application No. 12/428,566, filed on Apr. 23, 2009, which is a continuation of application No. 11/170,963, filed on Jun. 30, 2005, now Pat. No. 7,545,864, which is a continuation of application No. 08/634,122, filed on Apr. 19, 1996, now Pat. No. 7,075,991, which is a continuation of application No. 08/180,613, filed on Jan. 13, 1994, now abandoned.

(30) Foreign Application Priority Data

Jan. 18, 1993   (JP) .................................. P5-005493

(51) Int. Cl.
*H04N 7/18* (2006.01)
(52) U.S. Cl. .................. 375/240.26; 375/240.28
(58) Field of Classification Search . 375/240.01–240.29
See application file for complete search history.

(56) References Cited

U.S. PATENT DOCUMENTS

| 4,758,881 A | 7/1988 | Laspada |
| 4,789,895 A | 12/1988 | Mustafa et al. |
| 4,918,523 A | 4/1990 | Simon et al. |
| 4,985,766 A | 1/1991 | Morrison et al. |
| 5,036,391 A | 7/1991 | Auvray et al. |
| 5,070,404 A | 12/1991 | Bullock et al. |
| 5,122,875 A | 6/1992 | Raychaudhuri et al. |
| 5,144,424 A | 9/1992 | Savatier |

(Continued)

FOREIGN PATENT DOCUMENTS

EP   0456394   11/1991

(Continued)

OTHER PUBLICATIONS

International Standard of Multi-Media Coding, Jun. 30, 1991 *pp. 126-142* Hiroshi Yasuda p. 133-p. 135*.

(Continued)

*Primary Examiner* — Andy Rao
(74) *Attorney, Agent, or Firm* — Frommer Lawrence & Haug LLP; William S. Frommer; Thomas F. Presson

(57) ABSTRACT

A picture decoding method and apparatus for encoding a video signal. The method includes performing an encoding process on the video signal to generate a bit stream compatible with MPEG 1 moving picture video standard. The method further includes controlling the encoding process so as to generate the bit stream which includes, a picture coding type in a previous picture header, an extension start code indicating the beginning of extension data added when a picture header includes control data that is newly added in MPEG 2 standard format in the previous header, the extension data in the previous header, and the picture coding type in a current picture header, and does not include the extension start code in the current picture header and the extension data in the current picture header.

5 Claims, 8 Drawing Sheets

U.S. PATENT DOCUMENTS

| | | | |
|---|---|---|---|
| 5,159,452 A | 10/1992 | Kinoshita et al. |
| 5,237,424 A | 8/1993 | Nishino et al. |
| 5,270,811 A | 12/1993 | Ishibashi et al. |
| 5,278,647 A | 1/1994 | Hingorani et al. |
| 5,287,178 A | 2/1994 | Acampora et al. |
| 5,289,276 A | 2/1994 | Siracuss et al. |
| 5,343,248 A | 8/1994 | Fujinami |
| 5,351,047 A | 9/1994 | Behlen |
| 5,371,547 A | 12/1994 | Siracusa et al. |
| 5,396,497 A | 3/1995 | Veltman |
| 5,440,345 A | 8/1995 | Shimoda |
| 5,455,629 A | 10/1995 | Sun et al. |
| 5,471,450 A | 11/1995 | Yonemitsu et al. |
| 5,502,493 A | 3/1996 | Meyer |
| 5,526,054 A | 6/1996 | Greenfield et al. |
| 5,539,466 A | 7/1996 | Igarashi et al. |
| 5,543,847 A | 8/1996 | Kato |
| 5,557,331 A | 9/1996 | Honjo |
| 5,568,200 A | 10/1996 | Pearlstein et al. |
| 5,727,091 A | 3/1998 | Kinouchi et al. |

FOREIGN PATENT DOCUMENTS

| | | |
|---|---|---|
| EP | 0503956 | 9/1992 |
| EP | 0543197 | 5/1993 |
| EP | 0573665 | 12/1993 |

OTHER PUBLICATIONS

Ming Kou, "Overview of the PX64 K1BT/S Video Coding Standard", 8070 Communications of the ACM, 34 Apr. 1991, No. 4, pp. 59-63.

H. Amor, et al., "Technical Issues in Low Rate Transform Coding," Optical Engineering, vol. 28, No. 7, Jul. 1989, pp. 700-707.

ISO/EIC JTCI/SC2/WG11 MPEG 91/217, Nov. 1991 'Matsushita proposal description for MPEG 11' *p. 15-p. 21* *p. 51, Paragraph 6-3*.

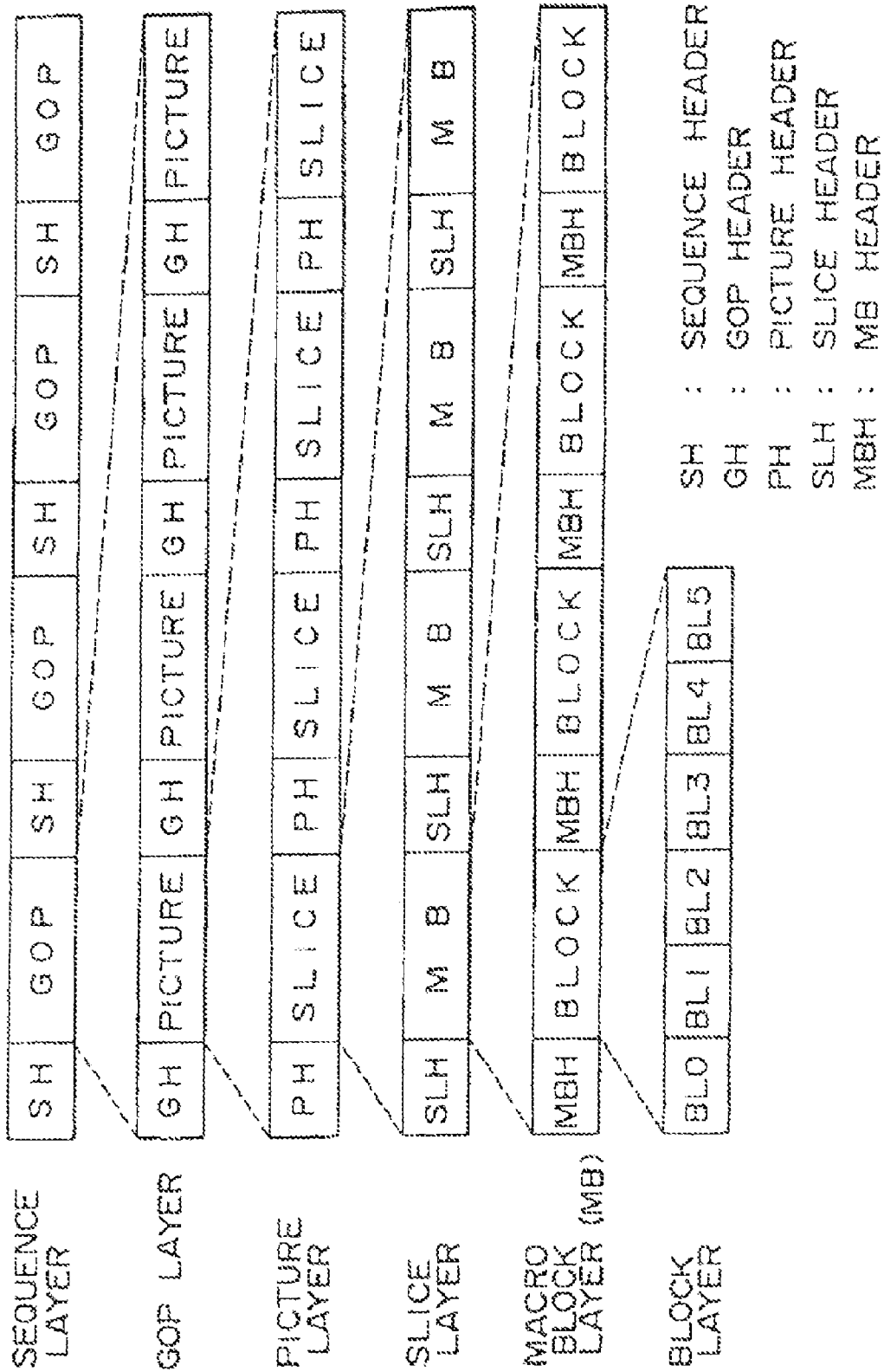

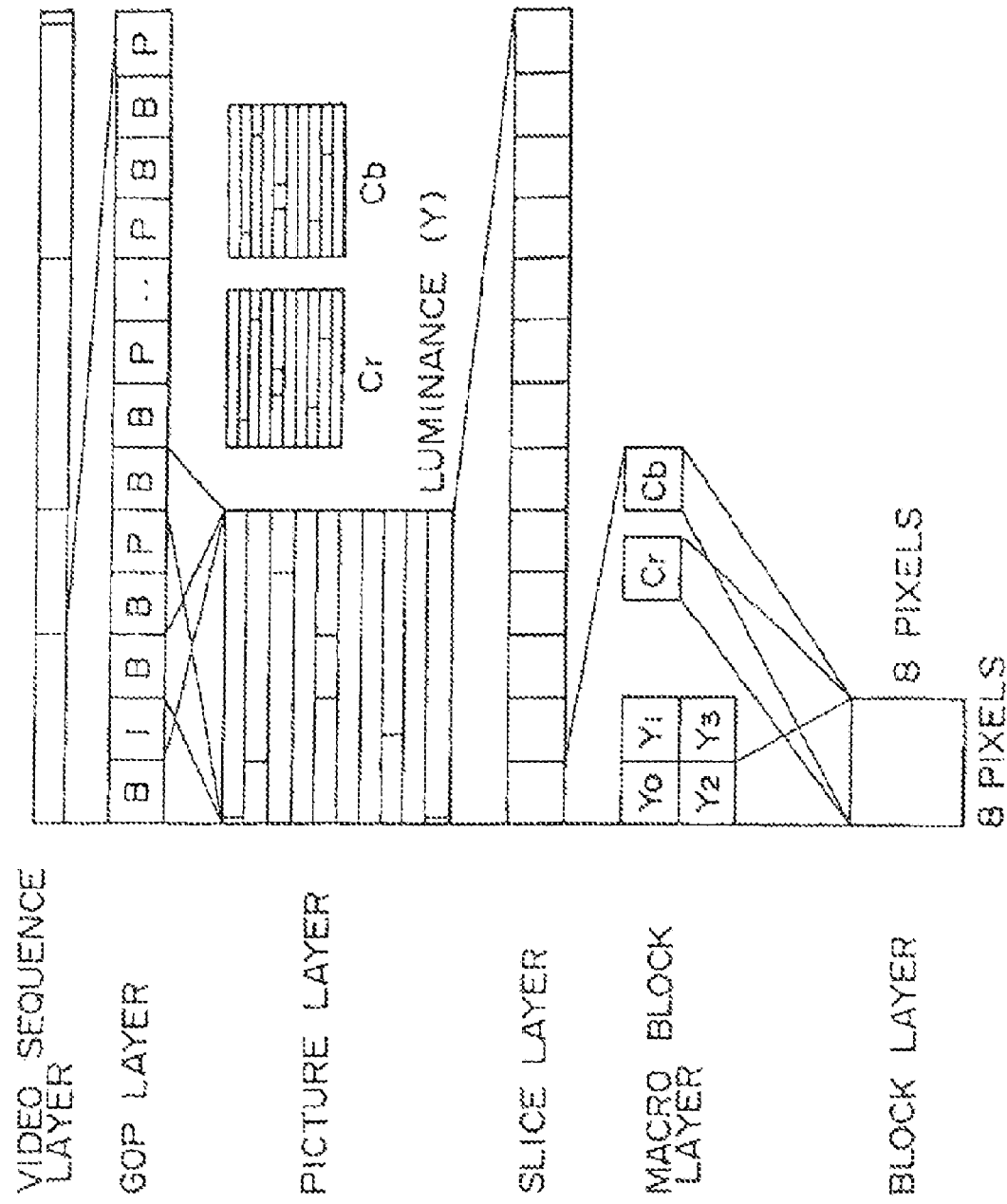

FIG. 4

```
picture0{
  picture_start_code                                    32      bslbf
  temporal_reference                                    10      uimsbf
  if(sscalable){
    lower_picture_reference                             10      uimsbf
  }
  picture_coding_type                                   3       uimsbf
  vbv_delay                                             16      uimsbf
  if(picture_coding_type==2 || picture_coding_type==3){
    full_pel_forward_vector                             1
    forward_f_code                                      3       uimsbf
  }
  if(picture_coding_type==3){
    full_pel_backward_vector                            1
    backward_f_code                                     3       uimsbf
  }
  while(nextbits() == '1'){
    extra_bit_picture                                   1       "1"
    extra_information_picture                           8
  }
  extra_bit_picture                                     1       "0"
  next_start_code()
  if(nextbits() == extension_start_code){
    extension_start_code                                32      bslbf
    if(picture_coding_type==2 || picture_coding_type==3){
      forward_vertical_f_code                           3       uimsbf
    }
    if(picture_coding_type==3){
      backward_vertical_f_code                          3       uimsbf
    }
    picture_structure                                   2       uimsbf
    forward_reference_fields                            2       uimsbf
    backward_reference_fields                           2       uimsbf
    if(chroma_format == "01"){ /*4:2:0*/
      chroma_postprocessing_type                        1       uimsbf
    }else{
      reserved                                          1       uimsbf
    }
    if(video_format!='000'){/*composite input*/
      v_axis                                            1       uimsbf
      field_sequence                                    3       uimsbf
      sub_carrier                                       1       uimsbf
      burst_amplitude                                   7       uimsbf
      sub_carrier_phase                                 8       uimsbf
    }
    pan_horizontal_left_upper_offset                    16      uimsbf
    pan_vertical_left_upper_offset                      16      uimsbf
    if(sscalable || fscalable){
      overlap_horizontal_left_upper_offset              17      simsbf
```

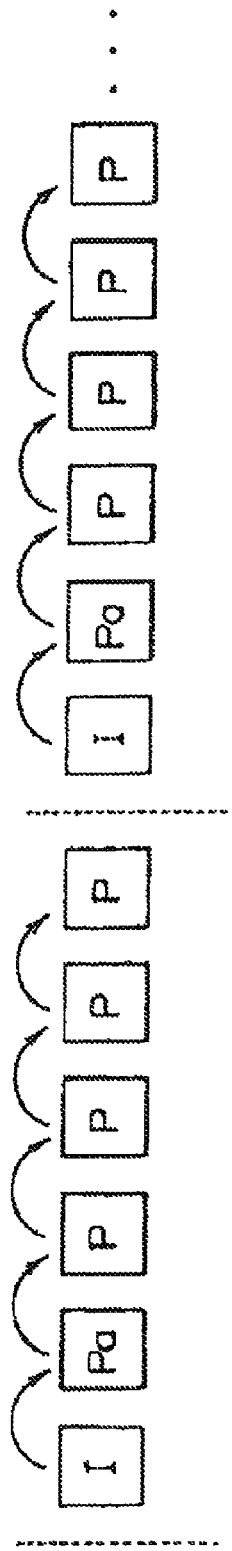

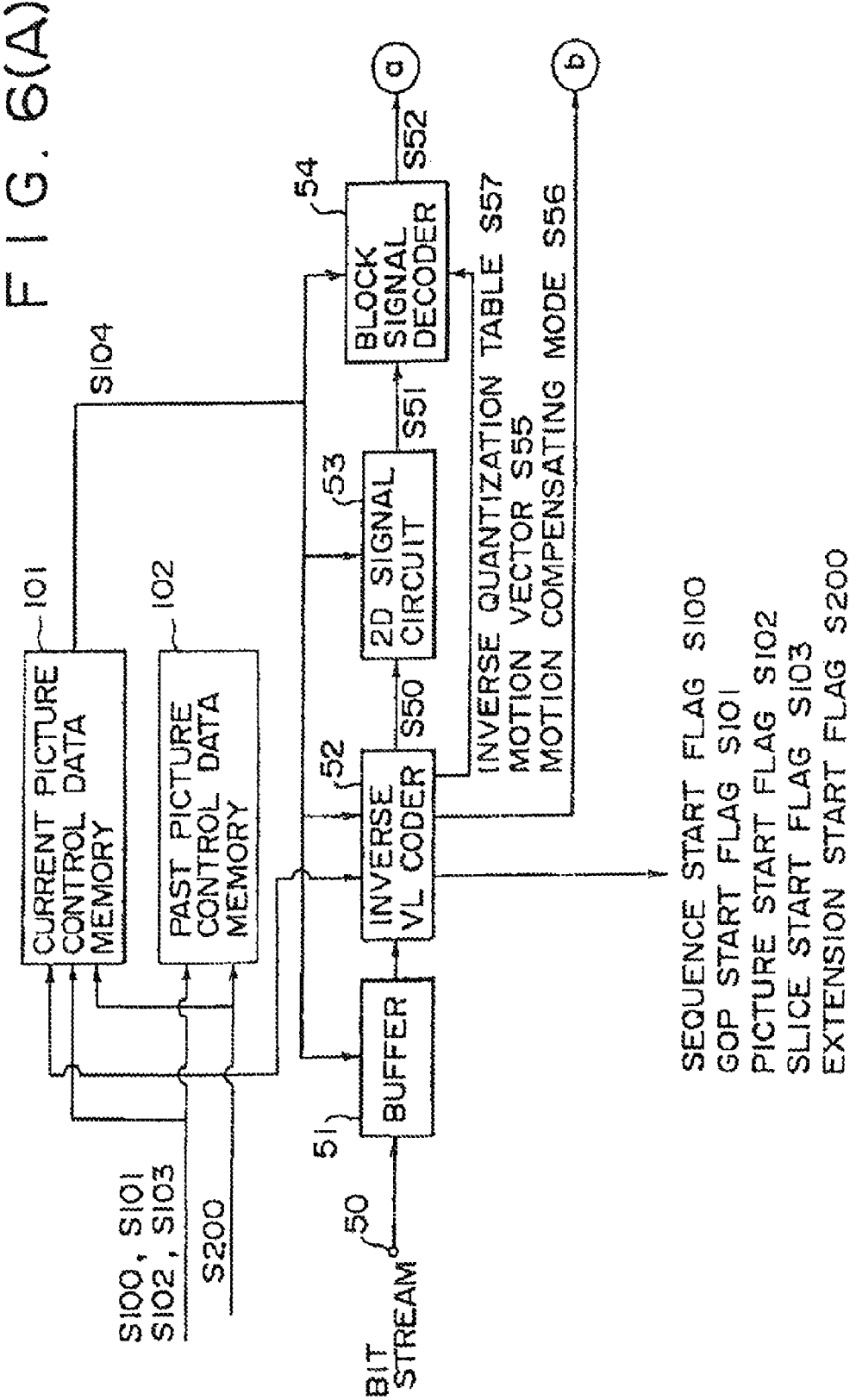

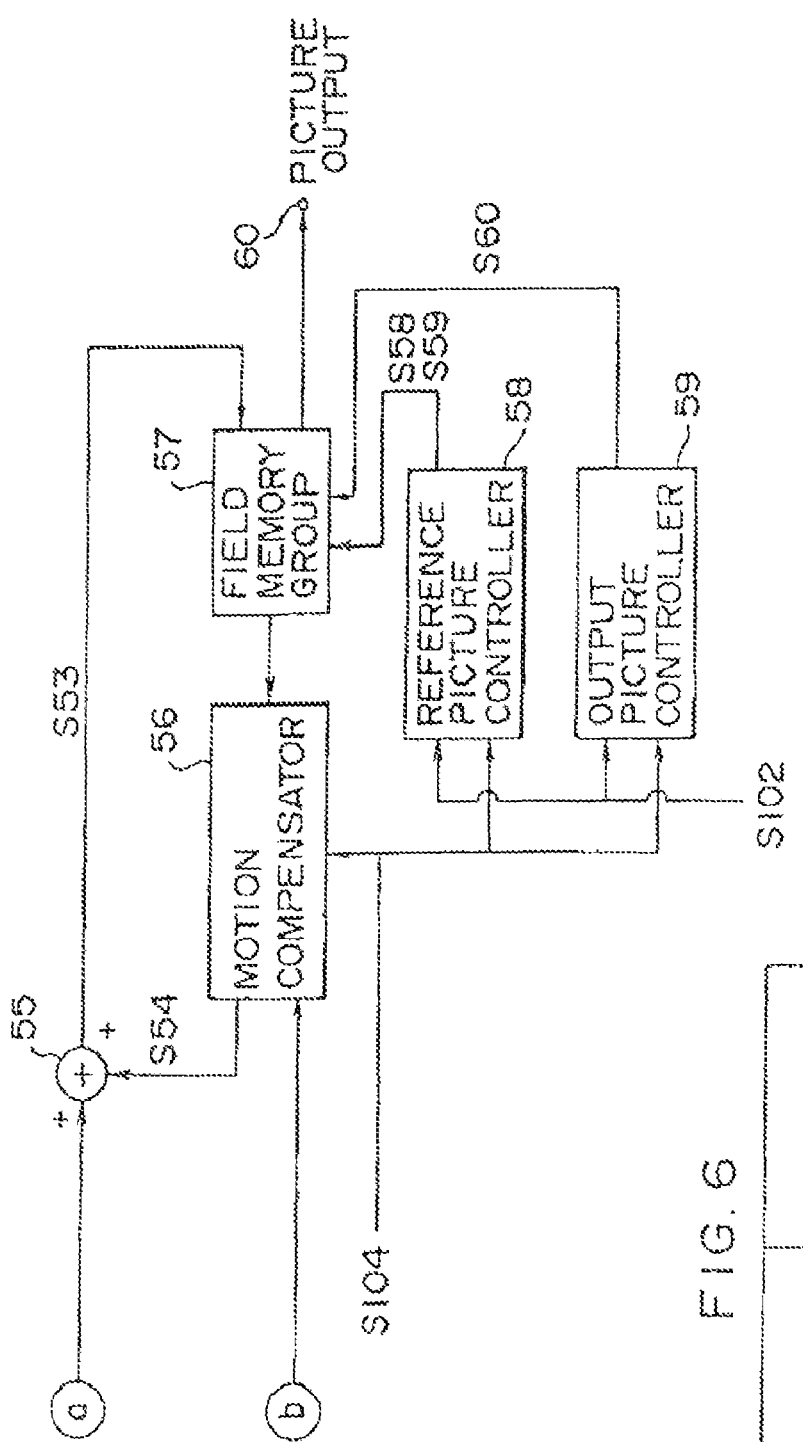

APPARATUS FOR ENCODING AND DECODING HEADER DATA IN PICTURE SIGNAL TRANSMISSION

This is a continuation of application Ser. No. 12/428,566, filed Apr. 23, 2009, which is a continuation of application Ser. No. 11/170,963, filed Jun. 30, 2005, now U.S. Pat. No. 7,545,864, which is a continuation of application Ser. No. 08/634,122, filed Apr. 19, 1996, now U.S. Pat. No. 7,075,991, which is a continuation of application Ser. No. 08/180,613, filed Jan. 13, 1994, now abandoned, which is entitled to the priority filing date of Japanese application P05-005493 filed on Jan. 18, 1993 the entirety all of which are incorporated herein by reference.

BACKGROUND OF THE INVENTION

1. Field of the Invention

The present invention relates to a picture encoding apparatus, a picture decoding apparatus, a picture encoding method, a picture decoding method, a picture signal transmission method and a picture recording medium adapted for use in compression of moving picture data.

2. Description of the Related Art

In recording and transmitting digitized moving pictures, it is customary to encode the data for compression since the data amounts to an extremely great quantity. There are known some typical encoding methods inclusive of motion compensating predictive coding and OCT (discrete cosine transform) coding. A picture signal is first converted into a different form by the use of such coding technology, and subsequently a variable-length code such as the efficient Huffman code is allocated to the converted signal by utilizing the statistical attributes of the converted signal, whereby compression of the picture data is realized.

The encoded data is termed a bit stream. FIG. 1 shows the structure of a bit stream in the format according to MPEG (Moving Picture Experts Group) 1. The MPEG 1 signifies a moving picture encoding standard progressed by WG (Working Group) 11 of SC (Sub Committee) in JTC (Joint Technical Committee) of ISO (international Organization for Standardization) and IEC (International Electrotechnical Commission).

A bit stream of the MPEG 1 comprises a total of six layers which are a video sequence layer, a GOP (group of pictures) layer, a picture layer, a slice layer, a macro block layer and a block layer. The individual layers will now be described below briefly with reference to FIG. 2.

1. Block Layer

A block layer is composed of, e.g., mutually adjacent 8 lines×8 pixels of luminance or color difference. For example, DCT is executed block by block as a unit.

2. MB Layer

When the picture format is based on 4:2:0 component signals, an MB layer is composed of a total of 6 blocks which consist of 4 horizontally and vertically adjacent luminance blocks, and 2 color difference blocks (Cb and Cr) at the same position on the picture. These blocks are transmitted in the order of Y0, Y1, Y2, Y3, Cb and Cr. A decision is made per MB layer as a unit for selecting the predictive data to be used or determining whether it is necessary or not to send a prediction error.

3. Slice Layer

A slice layer is composed of one or more macro blocks successive in the picture scanning order. This layer is so contrived that an intra-frame motion vector and a DC component difference are reset at the beginning of the slice, and the first macro block has data indicative of the intra-frame position so as to execute a return upon occurrence of any error. For this reason, the length of the slice layer and the beginning, position thereof are arbitrary and may be changed in accordance with the error state of the transmission channel.

4. Picture Layer

A picture layer of an individual frame is composed of at least one or more slice layers and is classified as I picture, P picture or B picture in accordance with the encoding method.

5. GOP Layer

A GOP layer is composed of one or more I pictures and none or a plurality of other pictures.

6. Video Sequence Layer

A video sequence layer is composed of one or more GOPs which are equal in both picture size and rate to each other.

The bit stream is so contrived as to enable picture reproduction from an intermediate point as well. More specifically, at the beginning of each of such video sequence layer, GOP layer, picture layer and slice layer, there is added a start code which signifies a start point. The start code is a unique one and generation of its bit pattern is inhibited except in the bit stream. Therefore it is rendered possible, by detecting the start code, to perform reproduction (random access) from an intermediate point in the bit stream or a return upon occurrence of any error in the transmission channel.

Header data is existent in succession to the start code to produce a video sequence header, a GOP header, a picture header and a slice header. The header data serves as control data required for decoding the encoded data in the individual layer and also for reproducing and displaying the picture. If there arises the requirement in the future that the header data needs to include more control data than that in the MPEG 1, it is possible to transmit a unique extension start code in the header and subsequently to transmit extension data which is composed of a multiple of 8 bits (extension byte). The syntax relative to the extension start code and the subsequent extension data is formed by taking into consideration the interchangeability with the MPEG 1.

Following such MPEG 1, preparation of MPEG 2 is currently in progress in an attempt to realize an improved encoding system for achieving a further enhanced picture quality. The bit-stream decoding control data newly added in the MPEG 2 is used for transmitting the extension start code in the header and then transmitting the extension data subsequently thereto.

With regard to the detailed bit stream syntax in the MPEG 1, there is a description in the Draft International Standard ISO/IEC DIS 11172.

In decoding the picture from the bit stream, header data is the most important out of the entire bit stream. Therefore, if the header data is lost due to any error or the like in the data transmission channel, it will bring about a fatal result in decoding the picture. The header data used in the MPEG 2 is greater in amount (number of bits) as compared with that in the MPEG 1. And in accordance with a quantitative increase of the header data in the bit stream, there arises a problem that the header data is more prone to be subjected to an error. In view of such point, it is preferred to minimize the amount of the header data to be transmitted.

Meanwhile in transmission of the header data, there may occur a case where some redundant data is transmitted. In transmitting a picture header for example, even when the current-picture encoding control data subsequent to the relevant extension start code is the same as the control data used for encoding the preceding picture already encoded, the entire header data are transmitted per picture header each time.

SUMMARY OF THE INVENTION

The present invention has been accomplished in view of the above problems observed in the prior art. And an object of the present invention resides in providing picture signal encoding and decoding methods adapted for reducing the quantity of header data in transmission.

And it is another object of the present invention to provide picture signal encoding and decoding methods capable of realizing improved transmission of picture signals with minimal errors.

Each of the foregoing and additional objects is achieved by the provision of the apparatus for encoding and decoding header data in picture signal transmission.

According to a first aspect of the present invention, there is provided a picture encoding apparatus comprising memory means for storing first control data included in header data of a predetermined layer subsequently to identification data; comparator means for comparing the first control data with second control data included in the next header data of the predetermined layer subsequently to the identification data; and encoding means so operated as to transmit neither the identification data nor the second control data when the first control data and the second control data are mutually the same, or to transmit both the identification data and the second control data when the first control data and the second control data are different from each other.

According to a second aspect of the invention, there is provided a picture decoding apparatus comprising memory means for storing control data included in header data of a predetermined layer subsequently to identification data; and decoding means for decoding the encoded picture signal by using, when none of the control data is existent in the next header data of the predetermined layer, the preceding control data stored in the memory means.

According to a third aspect of the invention, there is provided a picture recording medium having a first encoded picture signal of a predetermined layer including identification data and control data subsequent thereto; and a second encoded picture signal of a layer being the same in kind as the said predetermined layer and including none of the identification data and the control data.

According to a fourth aspect of the invention, there is provided a picture encoding method comprising the procedure of encoding first control data, which is included in header data of a predetermined layer subsequently to identification data, with second control data included in the next header data of the predetermined layer subsequently to the identification data; and encoding the identification data and the second control data only when the first control data and the second control data are different from each other.

According to a fifth aspect of the invention, there is provided a picture decoding method which comprises the procedure of storing first control data included in header data of a predetermined layer subsequently to identification data; and decoding the encoded picture signal by using the stored control data when none of the control data is existent in the next header data of a layer being the same in kind to the said predetermined layer.

And according to a sixth aspect of the invention, there is provided a picture signal transmission method which transmits a first encoded picture signal of a predetermined layer including identification data and control data subsequent thereto; and also transmits a second encoded picture signal of a layer being the same in kind as the said predetermined layer and including none of the identification data and the control data.

The above and other objects, features and advantages of the present invention will be apparent in the following detailed description of preferred embodiments when read in conjunction with the accompanying drawings, in which like reference numerals are used to identify the same or similar parts in the several views.

BRIEF DESCRIPTION OF THE DRAWINGS

FIG. 1 is a schematic diagram for explaining the structure of a video bit stream in the MPEG format;

FIG. 2 is a schematic diagram for explaining the structure of data in the MPEG format;

FIG. 4 is a schematic diagram for explaining header data of a picture layer;

FIG. 5 is a schematic diagram for explaining the structure of motion predictive compensation; and FIGS. 6(A) and (B) are a block diagram showing the constitution o~ a preferred embodiment representing the picture decoding apparatus of the invention.

DETAILED DESCRIPTION OF THE INVENTION

Figure 3A:
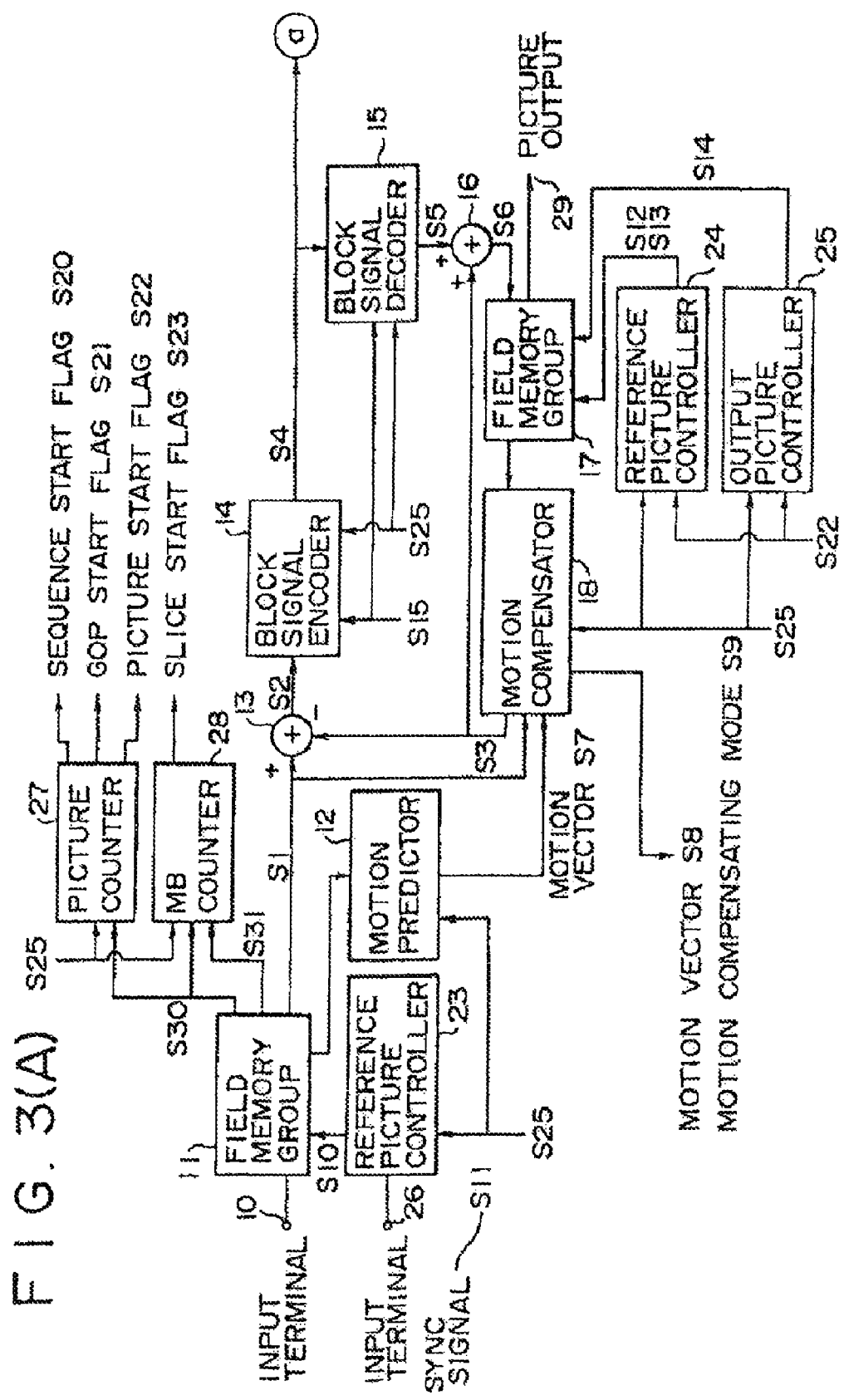
FIGS. 3(A) and (B) are a block diagram showing the constitution, of a preferred embodiment representing the picture encoding apparatus of the present invention.
Figure 3B:
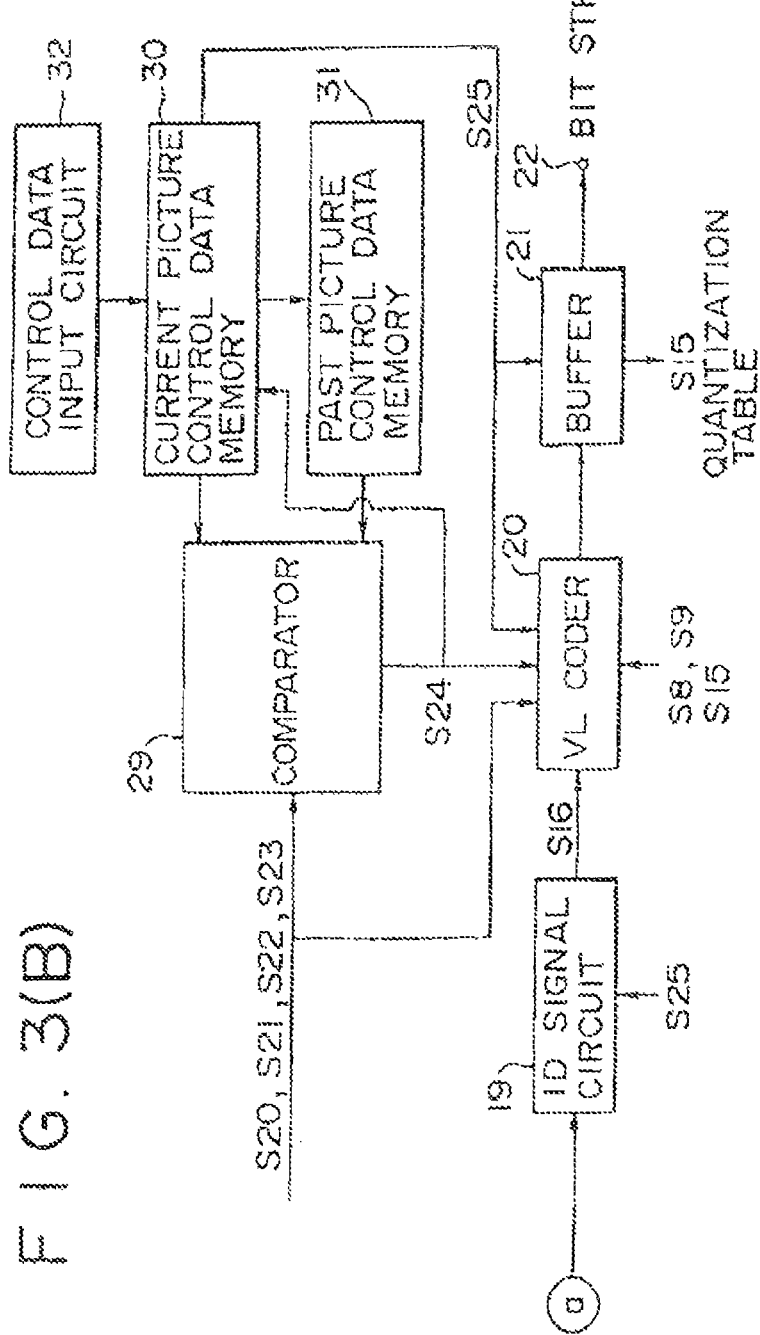

Hereinafter a moving-picture encoding apparatus of the present invention will be described with reference to FIGS. 3(A) and 3(B) which shows a preferred embodiment thereof. A picture signal received via a picture input terminal 10 is supplied to a field memory group 11. And simultaneously a vertical sync signal S11 received as an input picture sync signal via an input terminal 26 is supplied to a reference picture controller 23. In response to the sync signal 811, the reference picture controller 23 generates an undermentioned reference picture command signal SIO and supplies the same to the field memory group 11.

The field memory group 11 raises an undermentioned picture start flag S22 in synchronism with the beginning of a picture which is read out therefrom as an object to be currently encoded, and supplies the flag 822 to a reference picture controller 24. In response to such picture start flag S22, the reference picture controller 24 generates under mentioned reference picture command signals S12 and S13 and then supplies the same to a field memory group 17. Meanwhile the picture start flag S22 is supplied also to an output picture controller 25. In response to the picture start flag S22, the output picture controller 25 generates an undermentioned output picture command signal S14 and supplies the same to the field memory group 17.

Relative to the picture signal being supplied to the field memory group 11, a motion predictor 12 predicts the motion of pixels in the picture being currently encoded, with reference to a past picture and a future picture. The motion prediction corresponds to a block matching between the block pixel signal in the picture being currently encoded and the past or future picture being referred to. Each block has a size of e.g., 16 by 16 pixels. The past or future reference picture in this stage is designated out of the contents of the field memory group 11 in accordance with the motion predictive reference picture command signal S10 outputted from the reference picture controller 23. The motion predictor 12 supplies to a motion compensator 18 a motion vector 87 which represents the block position in the reference picture when the prediction error in the block matching is minimum.

The motion compensator 18 commands output of a block picture signal S3, which is positioned at the address designated by the motion vector S7, from the field memory group 17 where the picture already decoded and reproduced is stored. The reference picture in this stage is designated out of the contents in the field memory group 17 in accordance with the motion compensating reference picture command signal S12 outputted from the reference picture controller 24. Outputting the block picture signal S3 from the motion compensator 18 is an adaptive operation, and the optimal one is selectable block by block, by switching the following four operation modes.

Motion compensating mode from past reproduced picture
Motion compensating mode from future reproduced picture
Motion compensating mode from both past and future reproduced pictures (The reference block from the past reproduced picture and the reference block from the future reproduced picture are linearly calculated per pixel, e.g., by mean value calculation) intra-frame encoding mode without any motion compensation (in this mode, the output block picture signal S3 is substantially zero.)

The motion compensator 18 selects one mode having the minimum sum of the absolute values of the differences, relative to the individual pixels, between the output block pixel signal S3 in each of the above, four modes and the pixel signal S1 of the block being currently encoded. The mode thus selected is outputted as a motion compensating mode signal S9.

The currently encoded block pixel signal S1 obtained from the field memory group 11 and the block pixel signal S3 obtained from the motion compensator 18 are supplied to a subtracter 13 where the difference per pixel is calculated, so that a block difference signal S2 is obtained as a result of such calculation. The block difference signal S2 is then supplied to a block signal encoder 14 which generates an encoded signal S4. The encoded signal S4 thus obtained is supplied to a block signal decoder 15, which decodes the signal S4 to output a block reproduced difference signal S5.

The block signal encoder 14 may be constituted of a DCT (discrete cosine transformer) and a quantizer for quantizing the output coefficients of the OCT in accordance with a quantization table S15 designated from a buffer memory 21. In this case, the block signal decoder 15 nay be constituted of an inverse quantizer for inversely quantizing the quantized coefficients in accordance with the table S15, and an inverse DCT for executing inverse discrete cosine transformation of the output coefficient of the inverse quantizer.

The block reproduced difference signal S5 is supplied to an adder 16 so as to be added per pixel to the block picture signal S3 outputted from the motion compensator 18, whereby a block reproduced signal S6 is obtained as a result of such addition.

The block reproduced signal S6 is stored in the field memory designated, out of the field memory group 17, by the current picture command signal S13. Then, out of the entire reproduced pictures stored in the field memory group 17, the reproduced picture designated by the aforementioned output picture command signal S14 is delivered from a terminal 29.

Meanwhile the block signal S4 is supplied to a one-dimensional signal circuit 19 which stores the signal in a one-dimensional linear arrangement to thereby produce a linear encoded signal S16.

The one-dimensional signal circuit 19 may be constituted of a scan converter which scans the block quantized DCT coefficients in a zigzag manner in the order of lower to higher frequencies.

The linear encoded signal S16 is supplied, together with the motion vector S8 and the motion compensating mode S9 and the quantization table S15, to a VLC (variable-length coder) 20 which converts the input signal into a variable-length code such as the Huffman code. The coded signal is once stored in a buffer memory 21, and then the bit stream thereof is delivered at a fixed transmission rate from an output terminal 22.

The bit stream is multiplexed with the encoded audio signal, sync signal and so forth, and further an error correction code is added thereto. And after being processed through a predetermined modulation, the composite signal is recorded in the form of pits on a master disk via a laser light beam. A stamper is produced by utilizing such master disk, and further a multiplicity of replica disks (e.g., optical disks) are manufactured by the use of such stamper.

As described previously with regard to the conventional example of the prior art, the bit stream is composed of a total of six layers which are a video sequence layer, a GOP layer, a picture layer, a slice layer, a macro block layer and a block layer, linear encoded signal S16, the motion vector S8, the motion compensating mode S9 and the quantization table S15 are under the macro block layer in the bit stream. A start code is not included in the macro block layer or the block layer either. Meanwhile in each of the video sequence, GOP, picture and slice layers, a start code indicative of a start point is added at the beginning, and thereafter the header data is transmitted.

The individual start codes are transmitted in synchronism with the rise of a video sequence start flag S20, a GOP start flag S21, a picture start flag S22 and a slice start flag S23, respectively. The flags S20, S21 and S22 are outputted from a picture counter 27, and the flag S23 is outputted from a macro block (MB) counter 28.

The picture counter 27 counts the signal S30 outputted after detection of the beginning of the picture read out from the field memory group 11 to be currently encoded. The picture counter 27 is reset at the start of encoding the video sequence which is to be encoded, and simultaneously the video sequence start flag S20 is raised. The picture start flag S22 is raised in response to arrival of the signal S30. The GOP start flag S21 is raised when the count output of the picture counter 27 has reached a multiple of a predetermined GOP length (the number of pictures to make up a GOP). Generally the GOP length corresponds to 12 or 15 frames. This data is supplied to a picture encoding control data input circuit 32 and is stored in the memory 30 where the control data for encoding the current picture is stored.

The MB counter 28 counts the signal S31 outputted after detection of the beginning of the macro block (MB) which is the object to be currently encoded and is read out from the field memory group 11. The MB counter 28 is reset in response to the signal S30. The slice start flag S23 is raised when the count output of the MB counter 28 has reached a multiple of a predetermined slice length (the number of macro blocks to make up a slice). Generally the slice length corresponds to one stripe (the number of macro blocks equal to the length of one horizontal line on the picture). This data is supplied to a picture encoding control data input circuit 32 and is stored in the memory 30.

In response to a rise of the start flag S20, S21, S22 or S23, the VLC 20 delivers a start code of the relevant layer and subsequently outputs control data as header data for encoding the data of the relevant layer in the memory 30.

Now the header data outputted in this stage will be explained below specifically by taking the picture layer as an example. FIG. 4 shows the bit stream syntax of the picture layer described in "Test Model 3, Draft Revision 1" p. 57, issued by ISO-1EC/JTC1/SC29/WG11 on Nov. 25, 1992. Encoding control data is included next to a 32-bit picture start code. The control data transmitted after a 32-bit extension start code is the one newly added in the MPEG 2 format, and the data transmitted anterior thereto are those already existent in the MPEG 1 format. With regard to the individual codes, detailed description is given in the explanatory manual for the MPEG 2 format. Relative to transmission of the control data, the following improvements are contrived in this embodiment. After the extension start code, a 4-bit extension start code identifier is encoded to identify the type of the control data. For the purpose of simplifying the description of this embodiment, hereinafter the code inclusive of such extension start code identifier will be expressed merely as "extension start code".

First, relative to the control data of the picture layer, the control data transmitted subsequently to the "extension_start_code" is duplicated from the memory 30 and then is stored in the memory 31. Thereafter, when the picture header data is transmitted in response to a rise of the picture start flag S22, the content of the control data subsequent to the extension start code in the header data stored in the memory 30 for transmission is compared by a comparator 29 with the content of the header data of the picture layer stored in the memory 31. The control data is delivered to the picture encoding control data input circuit 32.

If the result of such comparison represented by the signal S24 signifies that the compared data are mutually the same, it is not exactly necessary to transmit the extension start code and the control data subsequent thereto. However, if the result of the above comparison represented by the signal S24 signifies that the compared data are different from each other, both the extension start code and the control data subsequent thereto need to be transmitted. In the latter case, the control data in the memory 30 is overwritten in the memory 31. The control data anterior to the extension start code is transmitted in any case.

In this embodiment, a remarkably great effect is achievable when the pictures of the GOP layer are in the encoding structure of FIG. 5 for motion predictive compensation. In this diagram, an I picture is an intra-frame coded picture, and a P picture is an inter-frame predictive coded picture. The motion is predicted from the latest decoded I picture or P picture, and the prediction error at the time is encoded. Since the P picture is encoded by cyclic prediction, the P picture encoding condition remains unchanged in most cases. Therefore, relative to transmission of any picture header data posterior to the extension start code, it becomes possible, by employing the method of the invention, to transmit merely the header data of the P picture denoted by Pa in the diagram, hence realizing reduction of the loss caused due to transmission of redundant header data and further minimizing the required header data.

The process described above with regard to the picture layer is executed similarly for the video sequence layer, the GOP layer and the slice layer as well.

The moving-picture encoding apparatus thus constituted performs the operations of encoding a moving picture and outputting a bit stream thereof and the encoded picture.

Hereinafter the moving-picture decoding apparatus of the present invention will be described with reference to a preferred embodiment shown in FIGS. 6(A) and 6(B). A bit stream signal received at an input terminal 50 via a transmission medium such as an optical disk is once stored in a buffer memory 51 and then is supplied therefrom to an inverse VLC (variable length coder) 52.

The bit stream is composed of a total of six layers which are a video sequence layer, a GOP layer, a picture layer, a slice layer, a macro block layer and a block layer. Start codes indicating the respective beginnings of the video sequence. GOP, picture and slice layers are received, and then header data for control of decoding the picture are received.

In response to the individual start codes thus received, there are raised a video sequence start flag S100, a GOP start flag S101, a picture start flag S102 and a slice start flag S103.

Upon rise of such start flag S100, S101, S102 or S103, the inverse VLC 52 decodes the header data of the individual layers and stores in a memory 101 the control data thus obtained, for decoding the picture.

Now the header data decoded in this stage will be explained below specifically by taking the picture layer as an example. The description will be given with reference to the aforementioned bit stream syntax of the picture layer shown in FIG. 4. In this embodiment, the following improvements are contrived relative to the control data of the picture layer.

First the control data of the picture layer decoded subsequently to the extension start code is duplicated from the memory 101 and then is stored in the memory 102. Upon reception of the extension start code, an extension start flag S200 is raised.

Subsequently a picture start flag S102 is raised, and if none of the extension start code is included in the picture header data to be decoded, i.e., when the extension start flag S200 is not raised, the header data of the picture layer stored in the memory 102 is duplicated and stored in the memory 101 so as to be used as the control data subsequent to the extension start code of the picture layer being currently encoded. Meanwhile, if the flag S200 is raised, the control data subsequent to the extension start code in the memory 101 is overwritten in the memory 102. The control data anterior to the extension start code is decoded in any case.

The process described above with regard to the picture layer is executed similarly for the video sequence layer, the GOP layer and the slice layer as well.

The header data is decoded in the manner mentioned, and the moving picture is decoded as will be described below on the basis of the control data S104 thus obtained.

Upon detection of the beginning of the picture to be decoded, the inverse VLC 52 raises a picture start flag S102 and supplies the same to a reference picture controller 58. In response to a rise of the picture start flag S102, the reference picture controller 58 generates undermentioned reference picture command signals S58, S59 and supplies the same to a field memory group 57.

The picture start flag S102 is supplied also to an output picture controller 59. In response to a rise of the picture start flag S102, the output picture controller 59 generates an undermentioned output picture command signal S60 and supplies the same to the field memory group 57.

The encoded block signal S50 obtained from the inverse VLC 52 is supplied to a two-dimensional signal circuit 53, which produces a two-dimensional block signal S51. This signal S51 is then supplied to a block signal decoder 54 to be thereby decoded to become a block reproduced difference signal S52.

The block signal decoder 54 may be constituted of an inverse quantizer for inversely quantizing the quantized coefficients in accordance with the quantization table outputted from the inverse VLC 52, and an inverse DCT for executing inverse discrete cosine transformation of the output coefficient of the inverse quantizer.

The two-dimensional signal circuit 53 may be constituted of an inverse scan converter which scans the encoded block signal S50 in an inverse zigzag manner in the order of the coefficients from lower to higher frequencies.

Meanwhile the motion vector S55 and the motion compensating mode S56 obtained from the inverse VLC 52 are inputted to a motion compensator 56. Then the motion compensator S56 commands output of the block picture signal from the field memory group 57 where the picture already decoded and reproduced is stored.

More specifically, the reproduced picture designated by the aforementioned reference picture command signal S58 is recognized as a reference picture out of the field memory group 57, and there is commanded an output of the block picture signal positioned at the address in the reference picture designated by the motion compensating mode S56 and the motion vector S55.

Outputting the block picture signal from the motion compensator 56 is an adaptive operation conforming with the motion compensating mode S56, and the optimal one is selectable block by block by switching the following four operation modes. Each block has a size of, e.g., 16×16 pixels, Motion compensating mode from past reproduced picture Motion compensating mode from future reproduced picture Motion compensating mode from both past and future reproduced pictures (The reference block from the past reproduced picture and the reference block from the future reproduced picture are linearly calculated per pixel, e.g., by mean value calculation.)

Intra-frame encoding mode without any motion compensation (in this mode, the output block picture signal S54 is substantially zero.)

The block reproduced difference signal S52 is added per pixel by an adder 55 to the block picture signal S54 outputted from the motion compensator 56, and a block reproduced signal S53 is obtained as a result of such addition. The block reproduced signal S53 is stored in the field memory designated out of the field memory group 57 by the current picture command signal S59. And out of the reproduced pictures stored in the field memory group 57, the designated one is outputted from a terminal 60 in accordance with the aforementioned output picture command signal S60.

The moving-picture decoding apparatus is so constituted as described above to reproduce the picture from the video bit stream.

While the specific embodiments of the invention have been shown and disclosed, it is to be understood that numerous changes and modifications may be made by those skilled in the art without departing from the scope and intent of the invention.

What is claimed is:

1. An encoding method for encoding a video signal, the method comprising the steps of:
   performing, an encoding process on the video signal to generate a bit stream which is compatible with MPEG 1 moving picture video standard; and
   controlling the encoding process so as to generate the bit stream which includes, a picture coding type in a previous picture header, an extension start code indicating the beginning of extension data added when a picture header includes control data that is newly added in MPEG 2 standard format in the previous header, the extension data in the previous header, and the picture coding type in a current picture header, and does not include the extension start code in the current picture header and the extension data in the current picture header.

2. The encoding method according to the claim 1, wherein the extension data in the previous picture header is used in case of decoding current picture data of the bit stream.

3. An encoding apparatus for encoding a video signal, comprising:
   an encoding unit for performing an encoding process on the video signal to generate a bit stream which is compatible with MPEG 1 moving picture video standard; and
   a controlling unit for controlling the encoding process so as to generate the bit stream which includes, a picture coding type in a previous picture header, an extension start code indicating the beginning of extension data added when a picture header includes control data that is newly added in MPEG 2 standard format in the previous header, the extension data in the previous header, and the picture coding type in a current picture header, and does not include the extension start code in the current picture header and the extension data in the current picture header.

4. A picture decoding method, executed by a processor, for decoding a bit stream, the bit stream being compatible with MPEG 1 standard, the method comprising the steps of:
   detecting, in a current picture header of the bit stream, the presence of an extension start code indicating the beginning of extension data added in a picture header of the bit stream when the picture header includes control data that is newly added in MPEG2 standard; and
   decoding the bit stream in a current picture layer by using a picture coding type in the current picture header of the bit stream and the extension data of a previous picture header of the bit stream in ease the presence of the extension start code is not detected in the current picture header of the bit stream and by using the picture coding type of the current picture header of the bit stream and the extension data of the current picture header of the hit stream in case the presence of the extension start code is detected in the current picture header.

5. A picture decoding apparatus for decoding a bit stream, the bit stream being compatible with MPEG1 standard, the apparatus comprising:
   a detecting unit for detecting, in a current picture header of the bit stream, the presence of an extension start code indicating the beginning of extension data added in a picture header of the bit stream when the picture header includes control data that is newly added in MPEG2 standard; and
   a decoding unit for decoding the bit stream in a current picture layer by using a picture coding type in the current picture header of the bit stream and the extension data of a previous picture header of the bit stream in case the presence of the extension start code is not detected in the current picture header of the bit stream and by using the picture coding type of the current picture header of the bit stream and the extension data of the current picture header of the hit stream in case the presence of the extension start code is detected in the current picture header.

* * * * *